United States Patent

[11] 3,612,612

| [72] | Inventor | Mathew R. Gannon<br>243 Park Ave., Revere, Mass. 02151 |
|---|---|---|
| [21] | Appl. No. | 849,043 |
| [22] | Filed | Aug. 11, 1969 |
| [45] | Patented | Oct. 12, 1971 |

[54] CLIPS FOR THE SPOKES OF BICYCLE WHEELS AND THE LIKE
2 Claims, 4 Drawing Figs.

[52] U.S. Cl. ............................................. 301/37 SA
[51] Int. Cl. ............................................. B60b 7/00
[50] Field of Search ........................... 301/37 RD, 37 SA, 37 P

[56] References Cited
UNITED STATES PATENTS

| 2,812,215 | 11/1957 | Waite .......................... | 301/37 P |
| 1,510,048 | 9/1924 | Evans .......................... | 301/37 (SA) |
| 1,950,082 | 3/1934 | Farr ............................. | 301/37 (SA) |
| 2,558,423 | 6/1951 | Dobrosky ..................... | 301/37 (SA) |
| 3,082,041 | 3/1963 | Hamilton ..................... | 301/37 (SA) |
| 3,361,483 | 2/1968 | Main ........................... | 301/37 P |

*Primary Examiner*—Richard J. Johnson
*Attorney*—Abbott Spear

ABSTRACT: Clips for the spokes of bicycle wheels and the like are disclosed, each clip being in the form of an extruded, flexible, plastic length of a cross-sectional size and shape to receive and enclose a bicycle spoke with marginal portions extending substantially in abutment from end-to-end of the clip and operable to permit attachment. The coloring of the plastic materials is preferably with irridescent pigments.

PATENTED OCT 12 1971　　3,612,612

Inventor:
Mathew R. Gannon,
by Abbott Spear,
Attorney

CLIPS FOR THE SPOKES OF BICYCLE WHEELS AND THE LIKE

The present invention relates to clips attachable to the spokes of bicycle wheels.

Bicycles are widely used by children and are commonly provided with some form of decoration. One form of decoration is disclosed in U.S. Letters Pat. No. 2,558,423 in which it was proposed to ornament the spokes but the means disclosed were not adapted to meet the requirements of production or use even though recognizing that colored spoke ornaments would have substantial appeal to children and enable them to create individual designs.

The principal objective of the present invention is to provide spoke ornamentation that will meet the above referred-to requirements, an objective attained with ornamentation in the form of extruded plastic clips, the extrusion being of a cross-sectional size and shape to receive a spoke within it and having portions extending from end-to-end thereof and substantially in abutment but adapted to be opened to permit the clip to be fitted to a spoke.

Another objective of the invention is to provide such extruded lengths of a teardrop cross-sectional shape and sufficiently thin to be readily flexed.

Yet another objective of the invention is to provide lengths of different colors, each color to be incorporated in the plastic and desirably the pigments are of an irridescent type.

In the accompanying drawings, there is shown an embodiment of the invention illustrative of these and other of its objectives, novel features, and advantages.

Figure 1:
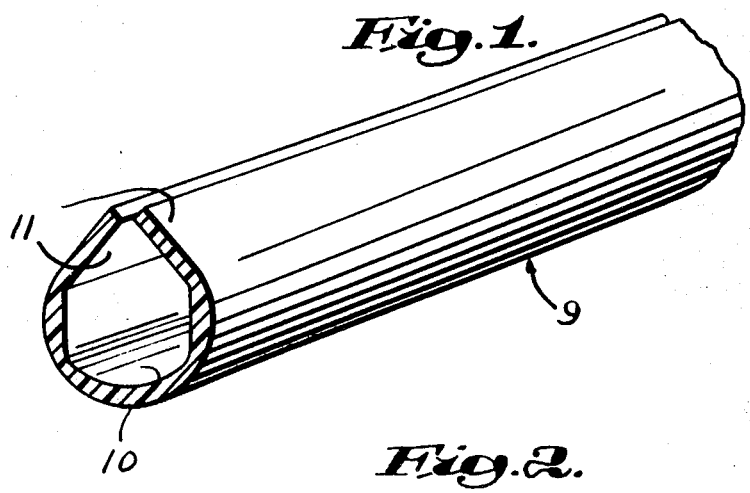
FIG. 1 is a fragmentary, perspective view of a spoke clip in accordance with the invention.
Figure 2:
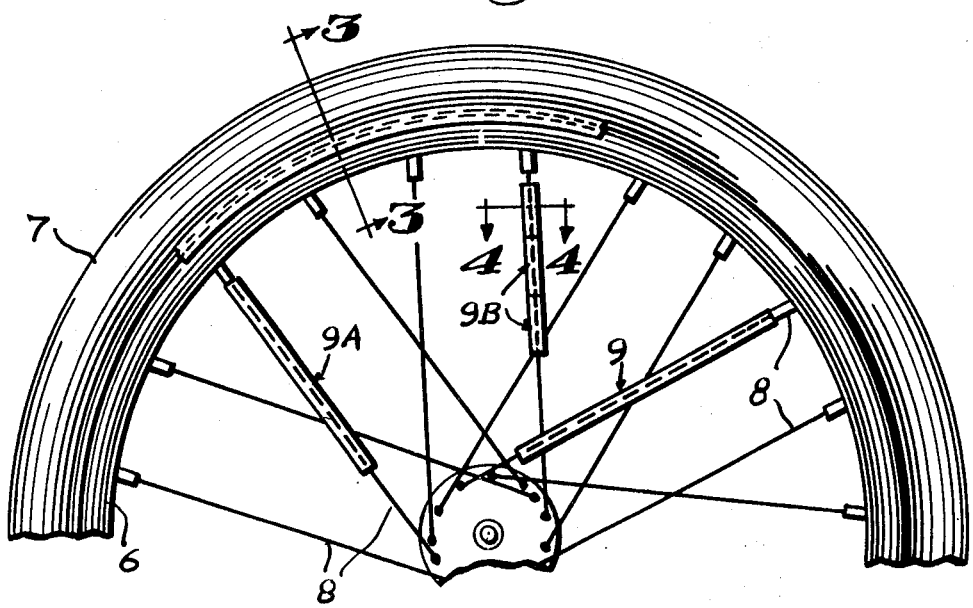
FIg. 2 is a fragmentary side view of a bicycle wheel to which clips in accordance with the invention have been attached.

In FIG. 2, there is shown a typical front bicycle wheel having a hub 5, a rim 6 for the tire 7 and connected to the hub 5 by spokes 8.

Figure 4:
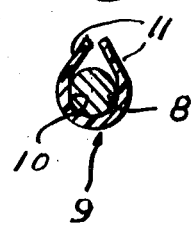
FIG. 4 is a section, on a further increase in scale, taken approximately along the indicated lines 4—4 of FIG. 2.

A clip in accordance with the invention is generally indicated at 9 and comprises a length of extruded plastic shown, see FIG. 4, as teardrop-shaped in cross section with its larger portion 10 of a size and shape to receive a spoke within it and with its margins 11 close together throughout its entire length. The clip 9 is shown as of a length about equal to that of a spoke 8 although it may be furnished in or cut by the user into shorter lengths to provide, for example clips 9A or 9B.

In the installation of the clips, the margins 11 of each clip 9 must be so opened as to enable it to be pressed in place against a spoke 8 and it is most easily effected with the teardrop shape shown in the drawings. Various plastics may be used with a linear polyethylene being preferred. With softer plastics, soft polyethylene, for example, the margins 11 are easily spread regardless of the cross-sectional shape of the clip and are readily closed by digitally applied pressure. When the clips 9 are made from harder plastics, the margins 11 are sufficiently resilient to return to their original position.

In practice, the clip material is extruded in substantial lengths utilizing a suitable plastic, the lengths being of different colors and the colors being preferably irridescent. The extruded material is to be distributed either in coils or in predetermined lengths, preferably approximately that of a spoke 8 thus enabling the purchaser to cut the lengths further to suit his own wishes, the clip 9A, for example, or the clips 9B, the latter being a preferred technique when the color changes are to be effected wholly or partly in a radial direction.

Figure 3:
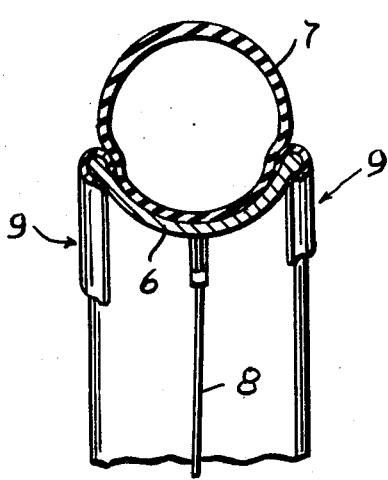
FIG. 3 is a section, on an increase in scale, taken approximately along the indicated lines the indicated lines 3—3 of FIG. 2.

It will be appreciated that clips in accordance with the invention are flexible which not only facilitates their installation on spokes but also enables them to be secured to other portions of a bicycle that are suitably dimensioned the wheel rim 6 as one example, see FIGS. 2 and 3.

From the foregoing, it will be apparent that clips are well adapted to meet a wide range of requirements including that of providing a bicycle with light-reflecting surfaces on the spokes or elsewhere, as a safety factor, colorful wheel ornamentation, and protection of the surfaces to which the clips are attached.

I claim:

1. An elongated attachment in combination with the spokes of a bicycle wheel, said attachment comprising a flexible strip of a colored plastic and of a uniform cross-sectional size and shape from end-to-end such as to snugly receive the spoke within it and including marginal edges providing a yieldable entrance spreadable to permit the entrance of the spoke therein as the attachment is pressed against the spoke, said attachment being sufficiently resilient that such marginal edges then return towards their normal relationship, said marginal edges including converging camming surfaces leading to the interior and to the exterior of said strip to facilitate application and removal of said strip from a spoke.

2. The attachment of claim 1 in which the marginal edges of the strip are closely spaced.